Patented Mar. 31, 1953

2,633,469

UNITED STATES PATENT OFFICE 2,633,469

PREPARATION OF SUBSTITUTED GLYCOLURILS

Homer Adkins, Madison, Wis., John E. Castle, Wilmington, Del., and Edwin Earl Royals, Atlanta, Ga.; said Castle and said Royals assignors to the United States of America as represented by the Secretary of the Navy No Drawing. Application March 29, 1946, Serial No. 658,210

10 Claims. (Cl. 260—309.7)

This invention relates to a process of preparing certain substituted diiminoglycolurils and a chlorine derivative thereof. More particularly this invention relates to a process of preparing 7,8-diphenyl-2,5-diiminoglycoluril and the tetrachloro derivative thereof.

In the past it has been proposed to prepare 7,8-diphenyl-2,5-diiminoglycoluril by reacting guanidine carbonate and benzil. The resulting compound is considered to have the following structural formula:

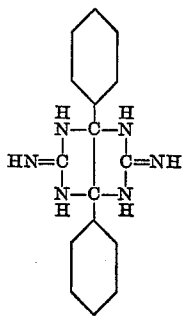

This compound may be chlorinated in an acid solution to produce the tetrachloro derivative which has unusual stability and neutralizing power for vesicants, such as mustard gas and the organic chloroarsines. This compound is thought to have the following structural formula:

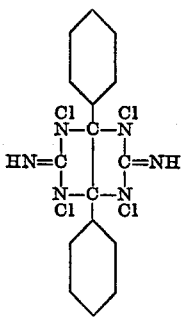

The process indicated above is chemically sound but economically not entirely satisfactory, however, because of the relatively high cost and unavailability of guanidine carbonate. Other salts of guanidine are not satisfactory starting materials in the guanidine carbonate process.

In accordance with this present invention it has been found that 7,8-diphenyl-2,5-diiminoglycoluril may, by the employment of a suitable condensing agent under proper reaction conditions, be prepared in good yields directly from guanidine nitrate which latter is cheaper and more readily available than the carbonate. Thus, it has been found that guanidine nitrate and benzil may be made to react in an alcoholic solution in the presence of an alkali or alkaline reacting condensing agent to produce the desired substituted diiminoglycoluril. For example, the reaction may be written as follows:

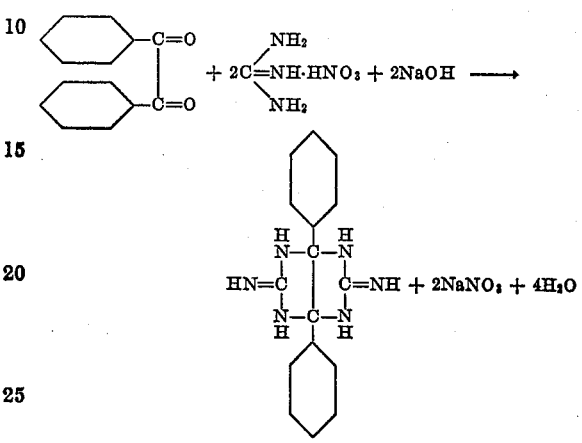

An important consideration in effecting the above indicated reaction is the avoidance of reaction conditions which tend to enhance the undesired benzilic acid type of rearrangement with the resulting formation of 5,5-diphenyl-2-iminohydantoin:

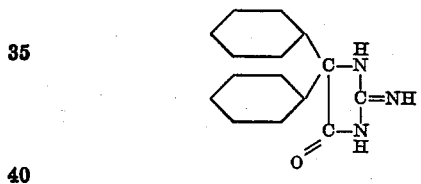

Accordingly, it is an object of this invention to provide a process for the preparation of 7,8-diphenyl-2,5-diiminoglycoluril in good yields from benzil and guanidine nitrate.

A further object of this invention is to provide a process for preparing a chlorine derivative of said diiminoglycoluril utilizing guanidine nitrate and without necessarily separating the intermediate glycoluril prior to the chlorinating step.

Further and additional objects will appear from the following description and the appended claims.

In accordance with one embodiment of this invention, benzil and guanidine nitrate are reacted in an alcoholic solution of an alkali or alkaline reacting material. Suitable alkaline reacting materials may be sodium carbonate or sodium hydroxide or mixtures thereof. The reaction mixture is preferably constantly stirred and the temperature is maintained between about 45 and 80° C., preferably between about 60 and 65° C. Although any of the lower alcohols may be used as the reaction medium, it has been discovered that isopropyl or tertiary butyl alcohol is particularly to be desired since these compounds tend to suppress the benzilic acid type of rearrangement with consequent increase in yields of the desired diiminoglycoluril. The resulting solid crude reaction product may then be treated with an aqueous acid solution and any undissolved impurities, including unreacted benzil, may be filtered from the resulting mixture. The pH of the filtrate may then be adjusted to about pH 8 by the addition of an alkali such as ammonia or sodium hydroxide. This causes the precipitation of any 5,5-diphenyl-2-iminohydantoin that is formed in the reaction. The precipitate is separated and the resulting solution containing substantially pure 7,8-diphenyl-2,5-diiminoglycoluril may be precipitated by further addition of alkali to the filtrate. Or, when sodium hydroxide is used to adjust the pH in the above separation, the solution may be acidified with hydrochloric acid and treated with gaseous chlorine to form a precipitate of the desired tetrachloro derivative, which is thought to be 1,3,4,6-tetrachloro-7,8-diphenyl-2,5-diiminoglycoluril.

For a more complete understanding of this invention reference will now be made to the following examples wherein are disclosed two specific methods for carrying out this invention.

Example 1

Benzil (210 g.; 1 mole), guanidine nitrate (244 g.; 2 moles), anhydrous sodium carbonate (106 g.; 1 mole), sodium hydroxide pellets (10 g.; 0.25 mole) and 500 ml. of 99% isopropyl alcohol were placed in a 2-liter, three-necked flask fitted with a six-inch water condenser and a Hershberg stirrer. (The Hershberg stirrer was made with two loops of No. 18 Nichrome wire on either side of a Pyrex glass rod shaft; the loops were just long enough to break the surface of the reaction mixture when at rest. The same results have been obtained in this condensation by using a metal paddle-type stirrer in a baffled flask. Apparently any type of stirring which serves to keep the solid phase in intimate contact with the liquid is satisfactory.) The reaction mixture was heated at 60–65° C. (in an oil bath at 70° C.) for six hours with sufficient vigorous stirring to keep the reactants well mixed without undue splashing. At thirty-minute intervals, 2 g. of sodium hydroxide pellets were added to the reaction mixture until eleven additions had been made. The last addition was made five and one-half hours after the reaction mixture had reached 60–65° C. Thus, the total amount of sodium hydroxide used was 32 g.

The reaction mixture was diluted with 2 liters of water at 70° C., stirred vigorously for ten to fifteen minutes and cooled to room temperature. The crude product was removed by filtration, sucked for about fifteen minutes to remove mother liquor, washed on the filter with 3 liters of water, and finally sucked for another fifteen minutes. The crude product was broken up in a 4-liter beaker and treated cautiously with a solution of 140 ml. of concentrated hydrochloride acid in 2650 ml. of water. The suspension was warmed to 50° C. with mechanical stirring. The pH of this mixture was approximately 1.0. Eight ml. of a 1% aerosol OT solution (dioctyl ester of sodium sulfosuccinic acid), a dispersing agent, were then added and the pH of the mixture at 50° C. adjusted to 8.0 by dropwise addition, during thirty minutes to one hour, of a 25% solution of sodium hydroxide with vigorous mechanical stirring in a baffled 4-liter beaker. (The beaker was baffled with a six-inch stainless steel spatula clamped vertically in the beaker to give about one-inch clearance between its outer edge and the flask wall. The baffle extended to within two and one-half inches of the bottom of the flask. Stirring was provided by a stainless steel paddle stirrer, three and one-half by three-quarters inches, near the bottom of the flask). Approximately 110–130 ml. of the solution of alkali were required. The material insoluble at pH 8 was separated by filtration at 50° C. and the cake washed with 300 ml. of water. This material comprising principally the hydantoin derivative amounted to 55–60 g.

The combined filtrate and washings containing the diiminoglycoluril was adjusted to pH 3–4 with 40–50 ml. of concentrated hydrochloric acid. This solution was treated with chlorine at 30–35° C.; the chlorine was introduced through a motor-driven gas-feed stirrer as rapidly as possible without causing undue splashing. About three and one-half to six hours were required for the chlorination, the end point being indicated by failure of a filtered sample of the mother liquor to give a precipitate when treated with sodium hydroxide pellets. The chlorinated product was filtered off and washed on the filter until chloride free. Two to 3 liters of water were required for this washing. The product was dried at 55° C. The yield of chlorinated product from this procedure has been 272–273 g., or 64% of the theory based on benzil; the product contained 30.8–31.3% of positive chlorine.

When it was desired to isolate the unchlorinated diiminoglycoluril, the filtrate from separation of the material insoluble at pH 8 was made strongly basic by addition of 100 ml. of 25% sodium hydroxide solution, well stirred and cooled at 10° C. in an ice bath. The precipitate was filtered off, washed by slurrying with 500 ml. of water and dried in an oven at 90° C. for twelve to twenty-four hours. The yield of this product was 196–200 g., or 67.0–68.0% of the theory based on benzil.

Example 2

Benzil (105 g.; 0.5 mole), guanidine nitrate (122 g.; 1.0 mole) and 250 ml. of 99% isopropyl alcohol were placed in a 1-liter, three-necked flask fitted with a short water condenser, a thermometer and a brass, paddle-type stirrer. (Several types of stirring have been employed in this synthesis; apparently any type of stirring which serves to keep the solid phase in intimate contact with the liquid is satisfactory.) The flask was heated in an oil bath maintained at 60–61° C. As soon as the temperature of the reaction mixture reached 50° C. (5–10 minutes), 10 g. of sodium hydroxide pellets were added. The temperature of the reaction mixture rapidly rose to about 60° C. Further additions of 10 g. portions of sodium hydroxide pellets were made at 30, 60 and 90 minutes after the first addition. The reaction mixture was heated with vigorous stirring for two hours after the first addition of sodium hydroxide; after each addition of sodium hydroxide, the temperature of the mixture rose to about 65° C. then fell to bath temperature before the next addition.

The reaction mixture was diluted with 1 liter of water at room temperature, stirred vigorously for five to ten minutes and cooled to room temperature. The crude product was removed by filtration, sucked for ten to fifteen minutes to remove mother liquor, washed on the filter with 1.5 liters of water, and finally sucked for another ten minutes. The crude product was broken up in a 2-liter beaker and treated with a solution of 70 ml. of concentrated hydrochloric acid in 1300 ml. of water. The suspension was warmed to 50° C. with mechanical stirring. The pH of this mixture was approximately 1.0. Four ml. of a 1% aerosol OT solution (dioctyl ester of sodium sulfosuccinic acid) were then added and the pH of the mixture at 50° C. adjusted to 8.0 by dropwise addition, during about thirty minutes, of a 25% solution of sodium hydroxide with vigorous mechanical stirring in a baffled 2-liter beaker. (The beaker was baffled with two 6 x 3/4 inch glass plates clamped vertically in the beaker to give about 1/2 inch clearance between their outer edges and the flask wall. The baffles extended to within about 1 1/2 inches of the bottom of the flask. Stirring was provided by a glass four-bladed paddle stirrer.) The material insoluble at pH 8 was separated by filtration at 50° C. and the cake washed with 100 ml. of water.

The combined filtrate and washings were adjusted to pH 3-4 with concentrated hydrochloric acid. This solution was treated with chlorine at 30-35° C.; the chlorine was introduced through a motor-driven gas-feed stirrer as rapidly as possible without causing undue splashing. About four hours were required for the chlorination, the end point being indicated by failure of a filtered sample of the mother liquor to give a precipitate when treated with sodium hydroxide pellets. The desired chlorinated product was filtered off and washed on the filter until chloride-free. About 1.0 to 1.5 liters of water were required for this washing. The product was dried at 55° C. The yield was 67–68% of theory based on the amount of benzil in the original reaction mixture.

When it was desired to isolate the unchlorinated diimioglycoluril, the filterate from separation of the material insoluble at pH 8 was made strongly basic by addition of 50 ml. of 25% sodium hydroxide solution, stirred well and cooled to 10° C. in an ice bath. The precipitate was filtered off, washed by slurrying with 250 ml. of water and dried in an oven at 90° C. for twelve to twenty-four hours. The yield was 69–73% of theory based on the amount of benzil in the original reaction mixture. Washing of the crude product is unnecessary if the unchlorinated base is to be isolated.

It will be apparent from the foregoing that an efficient process has been devised for preparing the diiminoglycoluril and/or its chlorinated derivative utilizing guanidine nitrate as one of the reactants. The percentage yield may be of the order of 65–75% of the theoretical based on the amount of benzil present in the original reaction mixture. As indicated in Example 2, above, the reaction time may be reduced to about 1 1/2 to 2 hours if the sodium hydroxide is added to the reaction mixture during the course of the reaction. In general, it may be stated that the use of an alkaline hydroxide in the proper amounts tends to speed up the desired reaction, the alkaline carbonates used alone tending to cause the reaction to proceed somewhat more slowly. This represents an improvement over the guanidine carbonate process of the prior art wherein the reaction time may be from 4 to 6 hours.

It has been found that the process of this invention may be carried out without materially affecting the desired yields by using technical grade reagents. Substantial quantities of water are avoided in the reaction mixture since water has a tendency to promote the benzilic acid type of rearrangement. Likewise large excesses of guanidine nitrate may tend to promote this side reaction and accordingly the molecular ratio of guanidine nitrate and benzil is preferably not substantially greater than about 2 to 1.

In the event that sodium or other carbonate is employed as a condensing agent as indicated in Example 1, it has been found that increased yields may be obtained if a stream of air or nitrogen is passed over the reaction mixture to remove the carbon dioxide gas formed.

By the term alkali or alkaline reacting materials as used in the foregoing description and the appended claims, it is intended to include the alkali or alkaline earth metal hydroxides or carbonates such as sodium, potassium, lithium, calcium or barium hydroxides; sodium potassium or lithium bicarbonates, and the alkali metal carbonates.

While two specific examples of this invention have been given in the foregoing it will, of course, be recognized that the specific conditions under which the reaction may be carried out may be varied without departing from the spirit and scope of this invention. Accordingly, it is intended that this invention be limited only by the scope of the appended claims.

Having described our invention what is claimed as new and desired to secure by Letters Patent is:

1. A method of preparing 7,8-diphenyl-2,5-diiminoglycoluril which comprises, reacting guanidine nitrate and benzil in an alcohol solution of an alkali at a temperature at which the aforesaid glycoluril compound is formed, the alcohol being selected from the group consisting of isopropyl alcohol and tertiary butyl alcohol.

2. A method of preparing 7,8-diphenyl-2,5-diiminoglycoluril which comprises, reacting guanidine nitrate and benzil in an isopropyl alcohol solution of an alkali at a temperature between about 45° and 80° C.

3. A method of preparing 7,8-diphenyl-2,5-diiminoglycoluril which comprises, reacting guanidine nitrate and benzil in an isopropyl alcohol solution of an alkali at a temperature between about 45° and 80° C., wherein the alkali is added to the reaction mixture periodically during the course of the reaction.

4. A method of preparing a tetrachloro derivative of 7,8-diphenyl-2,5-diiminoglycoluril which comprises, heating guanidine nitrate with benzil in an isopropyl alcohol solution of an alkali at a temperature and for a time sufficient substantially to complete the reaction, the guanidine nitrate and benzil being present in a mol ratio of not substantially greater than 2 to 1, separating the solid crude product from the solution, dissolving the crude product in an acid solution, adjusting the pH of the acidified solution with an alkali to about pH 8, separating the precipitate that forms as an undesired impurity, adjusting the pH of the resulting mother liquor to about pH 3 to 4 with an acid, reacting the resulting solution with chlorine gas to form a precipitate, and separating said last mentioned precipitate from the acidified solution as the desired product.

5. A method of preparing a tetrachloro derivative of 7,8-diphenyl-2,5-diiminoglycoluril which comprises, heating guanidine nitrate with benzil in an isopropyl alcohol solution of an alkali at a temperature between about 45° and about 80° C. and for a time sufficient substantially to complete the reaction, the guanidine nitrate and benzil being present in a mol ratio of not substantially greater than 2 to 1, separating the solid crude product from the solution, dissolving the crude product in an acid solution, adjusting the pH of the acidified solution with an alkali to about pH 8, separating the precipitate that forms as an undesired impurity, adjusting the pH of the resulting mother liquor to about pH 3 to 4 with an acid, reacting the resulting solution with chlorine gas to form a precipitate, and separating said precipitate from the acidified solution as the desired product.

6. A method of preparing a tetrachloro derivative of 7,8-diphenyl-2,5-diiminoglycoluril which comprises heating guanidine nitrate with benzil in an isopropyl alcohol solution of sodium hydroxide at a temperature and for a time sufficient substantially to complete the reaction, the guanidine nitrate and benzil being present in a mol ratio of not substantially greater than 2 to 1, separating the solid crude product from the solution, dissolving the crude product in an acid solution, adjusting the pH of the acidified solution with an alkali to about pH 8, separating the precipitate that forms as an undesired impurity, adjusting the pH of the resulting mother liquor to about pH 3 to 4 with an acid, reacting the resulting solution with chlorine gas to form a precipitate, and separating said last mentioned precipitate from the acidified solution as the desired product.

7. A method of preparing a tetrachloro derivative of 7,8-diphenyl-2,5-diiminoglycoluril which comprises heating guanidine nitrate with benzil in an isopropyl alcohol solution of sodium carbonate at a temperature and for a time sufficient substantially to complete the reaction, the guanidine nitrate and benzil being present in a mol ratio of not substantially greater than 2 to 1, separating the solid crude product from the solution, dissolving the crude product in an acid solution, adjusting the pH of the acidified solution with an alkali to about pH 8, separating the precipitate which forms as an undesired impurity, adjusting the pH of the resulting mother liquor to about pH 3 to 4 with an acid, reacting the resulting solution with chlorine gas to form a precipitate, and separating said last mentioned precipitate from the acidified solution as the desired product.

8. A method of preparing 7,8-diphenyl-2,5-diiminoglycoluril which comprises reacting guanidine nitrate with benzil in an isopropyl alcohol solution of an alkali at a temperature at which the aforesaid glycoluril compound is formed.

9. A method of preparing 7,8-diphenyl-2,5-diiminoglycoluril which comprises reacting guanidine nitrate and benzil in an isopropyl alcohol solution of sodium hydroxide at a temperature at which the aforesaid glycoluril compound is formed.

10. The method as defined in claim 9, wherein the reaction mixture is maintained at a temperature between about 45° and 80° C.

HOMER ADKINS.
JOHN E. CASTLE.
E. EARL ROYALS.

No references cited.